Oct. 28, 1924.
T. F. PURCELL
1,513,183
EYEGLASS FRAME
Filed Oct. 27, 1922
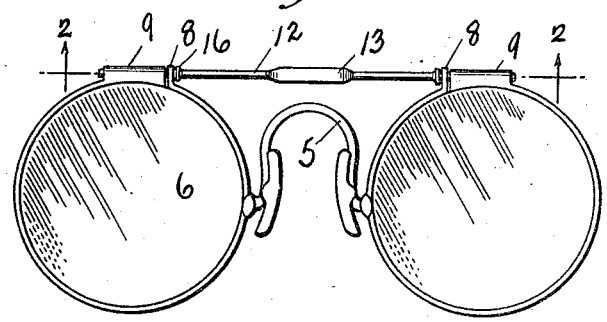
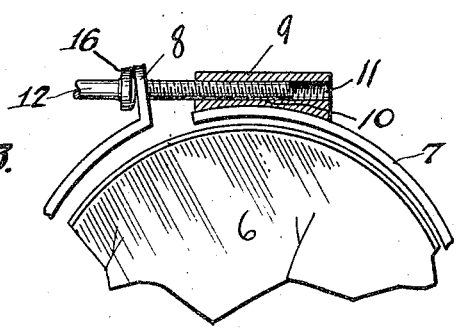
INVENTOR.
THOMAS F. PURCELL.
BY
Richard B Owen.
ATTORNEY.

Patented Oct. 28, 1924.

1,513,183

UNITED STATES PATENT OFFICE.

THOMAS F. PURCELL, OF NEW YORK, N. Y.

EYEGLASS FRAME.

Application filed October 27, 1922. Serial No. 597,310.

*To all whom it may concern:*

Be it known that I, THOMAS F. PURCELL, a citizen of the United States, residing at New York, in the county of New York and State of New York, have invented certain new and useful Improvements in Eyeglass Frames, of which the following is a specification.

This invention relates to optical frames or lens mountings and more particularly to a novel and improved construction whereby a pair of lenses may be simultaneously clamped in the frame without the aid of specialized tools or mechanical appliances.

The primary object of my invention is the provision of a lens frame or mounting wherein the lenses may be easily removed or replaced by hand and simultaneously clamped in position so that a single frame can be utilized for lenses having different focal lengths.

Another and equally important object of my invention is the provision of a lens mounting or frame wherein the parts are extremely simple in construction, easily assembled, highly efficient in operation and use, practical, durable, and otherwise capable of being manufactured at an extremely low cost whereby its commercial possibilities are greatly enhanced.

I accomplish the above objects and others which will become more apparent as the description proceeds and when taken in connection with the accompanying drawings, showing a preferred embodiment of my invention, wherein:

Figure 1 is a rear view of a lens frame showing my invention.

Figure 2 is an enlarged plan taken substantially on the line 2—2 of Figure 1.

Figure 3 is a detailed view of the clamping device for the lens.

Referring now to the drawings, wherein like reference characters designate corresponding parts throughout the several views, 5 designates the conventional U-shaped nose piece of a lens frame and 6 the lenses to be mounted therein, according to the manner now to be described. A split rim designated by numeral 7 is formed with an upstanding apertured ear 8, the opposite end of the rim 7 being provided with a tapped tube or enlargement 9, the bottom 10 of which is curvilinear to conform to the shape of the said rim. The tapped tube is internally threaded at 11 and receives the ends of a connecting rod 12 which rod is provided with a flat finger hold 13 substantially intermediate the ends thereof and directly above the nose piece 5. The respective ends of the rod 12 are provided with right and left hand threads 14, 15, respectively whereby upon rotation of the rod by the finger hold, the ends of the rim 7 may be brought together to clamp the respective lenses 6 simultaneously and with the same degree of pressure.

The rod 12 is also provided with a washer or enlargement 16 which bears against the apertured member 8 through which the threaded portion of the rod extends so that upon rotation of said rod, the respective ears 8 will be brought into engagement with the inner ends of the tapped member 9.

By reason of this construction it will also be seen that a mounting and frame of this character is adapted to accommodate lenses of different diameters in which instance, a slight space will remain between the ears and the tapped tubes yet will properly clamp the respective lenses securely in their proper position. This construction affords the use of a lens mounting for different sizes as well as lenses of different focal lengths since the respective lenses may be easily removed and replaced without the aid of specialized tools and appliances and avoids the expensive optical work incident to replacing broken lenses. Many other advantages of a lens mounting of this character will readily suggest themselves in accordance with the above description.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A lens frame of the class described in combination with a nose piece, comprising a pair of split lens rims, a connecting rod between the rims and above the nose piece and means disposed on said rod cooperating with the split rims whereby the latter may be contracted or expanded.

2. A lens frame of the class described in combination with a nose piece comprising a pair of split lens rims, an apertured member formed with one end of each rim and a threaded tubular member formed on the opposite end of each rim and a rod threaded at each end cooperating with the threaded tubular member to contract or expand said rims with respect to the lenses.

3. A lens frame of the class described in combination with a nose piece, comprising a pair of split lens rims, an upstanding apertured member formed with one end of each rim, internally threaded, tubular members formed on the opposite end of each rim, a connecting rod extending through each of the apertured members into the tubular members, right and left hand threads on the ends of the rod cooperating with the internally threaded members to contract and expand the same, and a flattened finger hold intermediate the ends of the rod for rotating the latter.

In testimony whereof I affix my signature in presence of two witnesses.

THOMAS F. PURCELL. [L. S.]

Witnesses:
  BENJAMIN COVITZ,
  HENRY H. RAPHIEL.